US009298625B2

(12) United States Patent
Naik et al.

(10) Patent No.: US 9,298,625 B2
(45) Date of Patent: *Mar. 29, 2016

(54) READ AND WRITE REQUESTS TO PARTIALLY CACHED FILES

(71) Applicant: GLOBALFOUNDRIES Inc., Grand Cayman (KY)

(72) Inventors: Manoj P. Naik, San Jose, CA (US); Frank B. Schmuck, San Jose, CA (US); Renu Tewari, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,401

(22) Filed: Jul. 10, 2015

(65) Prior Publication Data

US 2015/0317250 A1    Nov. 5, 2015

Related U.S. Application Data

(63) Continuation of application No. 14/057,040, filed on Oct. 18, 2013, now Pat. No. 9,098,413.

(51) Int. Cl.
| | |
|---|---|
| *G06F 12/00* | (2006.01) |
| *G06F 12/08* | (2006.01) |
| *G06F 3/06* | (2006.01) |
| *G06F 17/30* | (2006.01) |
| *G06F 7/00* | (2006.01) |

(52) U.S. Cl.
CPC ............ *G06F 12/0815* (2013.01); *G06F 3/064* (2013.01); *G06F 3/0604* (2013.01); *G06F 3/0673* (2013.01); *G06F 12/0808* (2013.01); *G06F 17/30132* (2013.01); *G06F 2212/1032* (2013.01); *G06F 2212/281* (2013.01); *G06F 2212/463* (2013.01)

(58) Field of Classification Search
CPC .................................. G06F 12/00; G06F 7/00
USPC ..................................... 711/118–136; 707/620
See application file for complete search history.

(56) References Cited

U.S. PATENT DOCUMENTS

| | | | |
|---|---|---|---|
| 5,226,141 | A | 7/1993 | Esbensen |
| 5,809,527 | A | 9/1998 | Cooper et al. |
| 5,893,086 | A | 4/1999 | Schmuck et al. |
| 5,931,918 | A | 8/1999 | Row et al. |
| 6,125,403 | A | 9/2000 | Berliner |

(Continued)

OTHER PUBLICATIONS

Anonymous, A Method for Fast Write Cache Replication Between Redundant Nodes in a Cluster, Jun. 21, 2012, pp. 1-4.

(Continued)

*Primary Examiner* — Christopher Shin
(74) *Attorney, Agent, or Firm* — Yuanmin Cai; Andrew M. Calderon; Roberts, Mlotkowski, Safran & Cole PC (57) ABSTRACT

Aspects of the invention are provided to support partial file caching on a file system block boundary. All read requests are converted so that offset and count are aligned on a block boundary. Data associated with read requests is first satisfied from local cache, with cache misses supported with a call to persistent or remote system. Similarly, for a write request, any partial blocks are aligned to the block boundary. Data associated with the write request is performed on local cache and placed in a queue for replay to the persistent or remote system.

15 Claims, 7 Drawing Sheets

(56) References Cited

U.S. PATENT DOCUMENTS

| | | | |
|---|---|---|---|
| 7,529,892 B2 | 5/2009 | Matsuzawa et al. | |
| 7,562,203 B2 | 7/2009 | Scott et al. | |
| 9,098,413 B2 * | 8/2015 | Naik | G06F 12/0808 |
| 2003/0028514 A1 | 2/2003 | Lord | |
| 2007/0248108 A1 | 10/2007 | Visser et al. | |
| 2011/0145499 A1 | 6/2011 | Ananthanarayanan | |
| 2012/0054152 A1 | 3/2012 | Adkins | |

OTHER PUBLICATIONS

Liu et al., Multiple Read and Exclusive Write State in MP Caches, IBM Technical Disclosure Bulletin, Dec. 1, 1991, vol. 34, No. 7A, pp. 218-220.

List of IBM Patents or Applications Treated as Related, Jul. 2015.

* cited by examiner

READ AND WRITE REQUESTS TO PARTIALLY CACHED FILES

CROSS REFERENCE TO RELATED APPLICATION(S)

This application is a continuation patent application claiming the benefit of the filing date of U.S. patent application Ser. No. 14/057,040 filed on Oct. 18, 2013 and titled "Read and Write Requests to Partially Cached Files" now pending, which is hereby incorporated by reference.

BACKGROUND

The present invention relates to partial file caching. More specifically, the invention relates to allowing local read and write requests while enabling partial file caching on a file system block boundary.

When a caching relationship is established between two file systems, one system cache presents a view of the other system, also known as remote. One mechanism of implementing a caching file system is to perform whole file caching. In such a system, when a file is read, the file system is aware if the file has been cached in its entirety. A file is either marked "cached" or "uncached". If a read request is made on an uncached file, the cache system does not have a way to determine if the request can be satisfied with data that is already present in the cache even if the data was previously read, and must make a request to a remote system to fetch the data. Until the file is marked cached after the whole file has been pre-fetched into the cache, all read requests must be forwarded to the remote system. Similarly, any in-place write requests and new allocations or file appends made to an uncached file must wait until the entire file has been pre-fetched. Accordingly, reading any part of a file causes all the contents of the file to be fetched from persistent storage and stored locally in the cache.

SUMMARY

The invention comprises a method, system, and computer program product for supporting partial file caching on a block boundary protocol in a clustered file system where multiple servers can simultaneously access the same file system.

A method, system, and computer program product are provided for partial caching of files. Data is cached on stable storage in a file system as it is being accessed. More specifically, the data is cached on a file system block boundary. Access to files includes aligning both read and write requests on the block boundary. When subject to a read request, the associated offset and number of bytes to be read are converted so as to be aligned on block boundary. The read request for data that is present in the cache, called a cache "hit", is satisfied locally, whereas requests for data that is absent in the cache, called a cache "miss", is satisfied with a call to a remote file system that is in a cache relationship with the cache file system. When subject to a write request, the associated offset and number of bytes to be written are converted so as to be aligned on block boundary. The write request is then performed on the local cache and subsequently placed in a queue for replay at the remote system.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cache file system is typically used to enhance the performance of remote file systems. In such a setup, the two file systems could be connected by a network, and the data read from the remote file system is stored in a cache on the local file system, thereby avoiding communication with the remote file system when the same data is accessed for a second time. Similarly, data can be written to the cache locally and asynchronously updated at the remote file system. This allows applications accessing the cache file system to benefit from local system performance for cached reads and new updates, without incurring the overheads of network communication with the remote file system. Since data is accessible once placed in the cache and updates can be made asynchronously, the cache file system can operate in "disconnected" mode even when communication with the remote file system is temporarily unavailable. The cache and remote file systems can also be clustered, which allows parallel applications to access and update the cache from multiple nodes in the system while file data and metadata is pulled into and pushed out of the cache in parallel.

Partial file caching only fetches the blocks that are accessed, thereby utilizing the network and local disk more efficiently than whole file caching, but at reduced performance both in terms of network bandwidth and cache misses. Partial file caching is useful if an application never intends to read the whole file, thereby saving storage space. Accordingly, allowing local reads and writes while enabling partial file caching on a file system block boundary, i.e., block level, is supported.

Alignments on a file system block boundary are employed for partial file caching. Read requests are converted such that the specified offset starts on a block boundary and the number of bytes to be read is exactly equal to one or more file system blocks. An application will attempt to satisfy the read request locally and only forward it from the remote system if the data blocks that map to the read parameters are not locally available. Accordingly, repeat requests to cached blocks do not encounter overhead associated with remote procedure calls between the cache and the remote system. Remote read requests to a remote system are always made in whole blocks. For write requests, data is always written in whole blocks. If the write offset does not originate on a block boundary and/or the number of bytes written is not a multiple of the file system block size, the cache might need to pre-fetch the first and/or last block of data from the remote system before the write is allowed.

Figure 1:
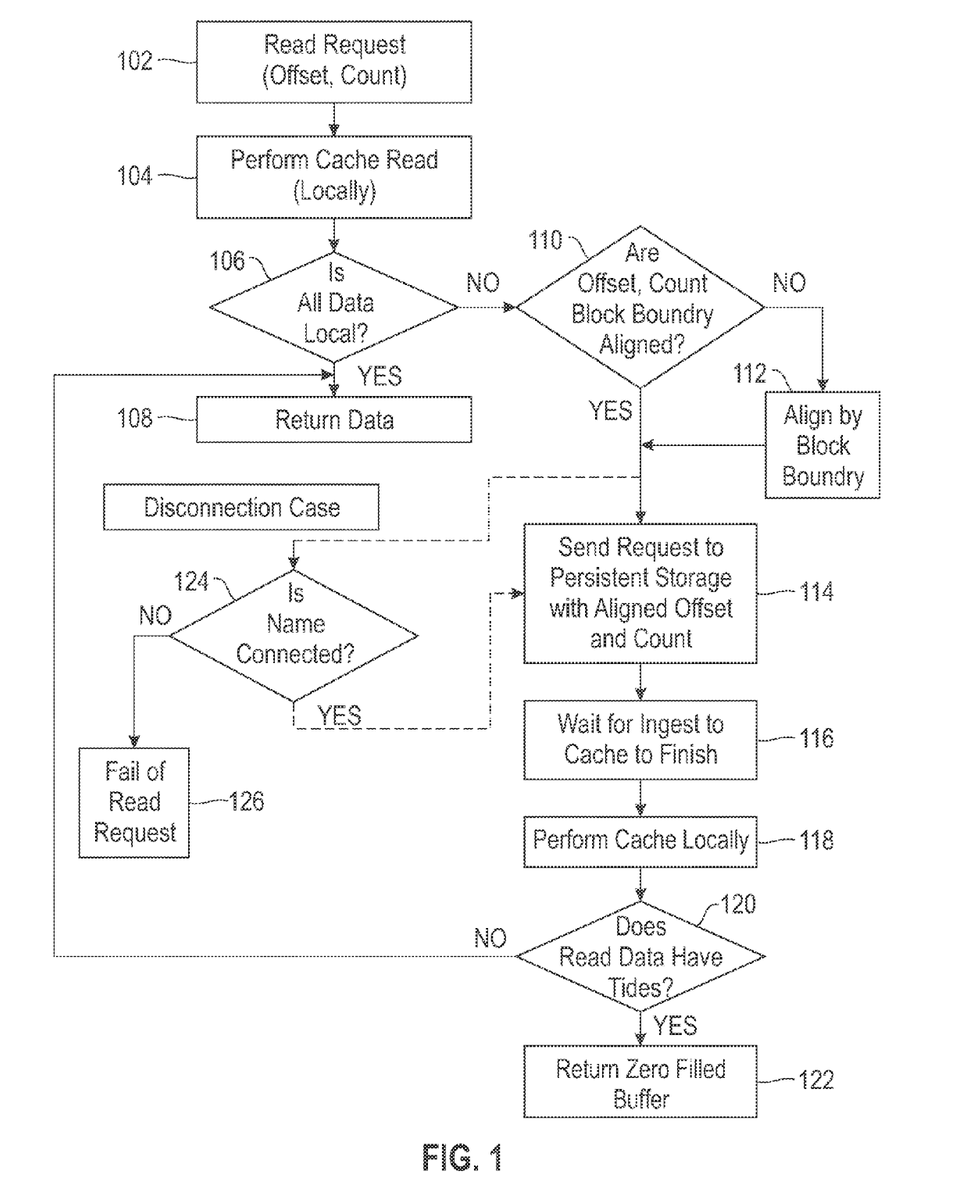
FIG. 1 depicts a flow chart illustrating the design of partial file caching while serving a read request.

The file system caches data on the granularity of a block, i.e. chunking by block size, with reading cached data on a whole block level. If a block is allocated in the cache as a result of satisfying a read request that is not in the cache (cache miss), the cache file system ensures that the whole block is cached. If the data block needed to service the request is not in the cache, a request is sent to fetch the block from a remote system. FIG. 1 is a flow chart (100) illustrating the design of partial file caching while serving a read request. A read request specifying the required data blocks is received (102). In one embodiment, the data blocks in the read request are identified by offset and count. Responsive to receipt of the request, a read from the local cache is performed (104). It is determined if all of the data identified in the request is present in the cache (106). If all of the data is present in the cache, the data is read from the cache (108). Accordingly, the first step in serving the read request is to ascertain presence or absence of the data in the cache and whether all of the data is available locally to service the request.

If at step (106) it is determined that the data available in the cache for the request has "holes", then the cache cannot satisfy the data in its entirety without communicating with the remote system. In one embodiment, a hole is a contiguous area of size that is a multiple of a file system block size that does not have any associated disk sectors reserved for that area of the file. Following a negative response to the determination at step (106), it is verified if the offset and count associated with the request are aligned on a block boundary (110). Prior to satisfying the request from storage, the request must be aligned on a block boundary. Accordingly, if at step (110) it is verified that the request is not aligned on the block boundary, an alignment is conducted (112).

Following a positive response to the determination at step (110), the disconnection scenario ascertains if the cache is in communication with remote file system (124). A positive response to the determination at step (124) is followed by a return to step (114). However, a negative response to the determination at step (124) is followed by a failure of the read request (126). In one embodiment, a communication to remote system is preceded by ascertainment of availability of communication between the cache and the remote system. Accordingly, with respect to a read operation, if the remote system is disconnected and the read cannot be satisfied from the cache and requires communication with the remote system, the read will fail.

Following the alignment at step (112) or a positive response to the verification at step (110), a request is sent to the remote system with the aligned offset and count (114). In one embodiment, the remote system, also referred to herein as separate storage or home, is persistent storage. The data for the request is brought into the cache, e.g. sent from the remote system into the cache (116), and a read of the local cache is performed (118). Following step (118), it is determined if the read request satisfied in the local cache has any holes, i.e. is all of the data present in the local cache (120). A negative response to the determination at step (120) is followed by a return to step (108) to read the data from the local cache. However, a positive response to the determination at step (120) is an indication that the read request cannot be satisfied in its entirety, and a zero filled buffer is returned (122). In one embodiment, a return of the zero filled buffer is an indication that the file is "sparse" and parts of the file are missing from the remote system. Accordingly, the read request is initially satisfied from the local cache, or alternatively brought in to the cache from the remote system.

FIG. 1 described in detail above illustrates satisfying a read request with partial file caching. As shown, a remote call for data blocks identifies missing blocks with offset and count. In one embodiment, it may be desirable to read more than the requested range of blocks. A pre-fetch strategy, such as sequential or random, may be employed to support having a greater quantity of blocks returned with the remote call. The cache can use the pre-fetch strategy to determine how much data to read. For example, in one embodiment, the minimum read size for a remote call may be set larger than a block size, and the pre-fetch strategy would map any read request to one that fetches data at the minimum read size.

Figure 2:
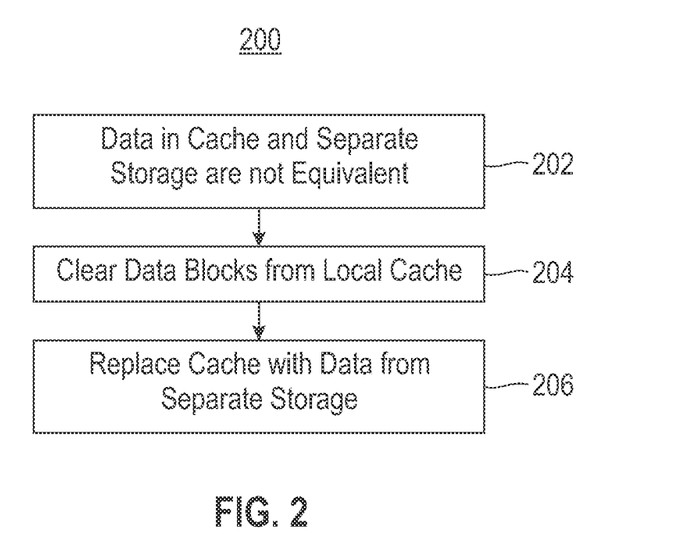
FIG. 2 depicts a flow chart illustrating a process of revalidating the data wherein a caching file system periodically checks with the remote system to determine if there has been a modification.

In one embodiment, a periodic check is performed to ensure the consistency of the cached data and the data at the remote system. This is typically done when the file is either accessed by name or opened for reading or writing. FIG. 2 is a flow chart (200) illustrating a process of revalidating the data. In response to a determination that the data in the cache and the remote system are not equivalent (202), a reconciliation of the data is performed. The aspect of equivalence may be performed by comparing file times, such as modification and change times, at the cache and remote, or by comparison of content using a checksum. In one embodiment, non-equivalent data is an indication that a file associated with the remote system has changed, and as such, the cache needs to be re-synchronized with the remote system. As such, the data blocks need to be cleared from the local cache (204). A subsequent read of the file will then fetch the data again from the remote system.

Figure 3:
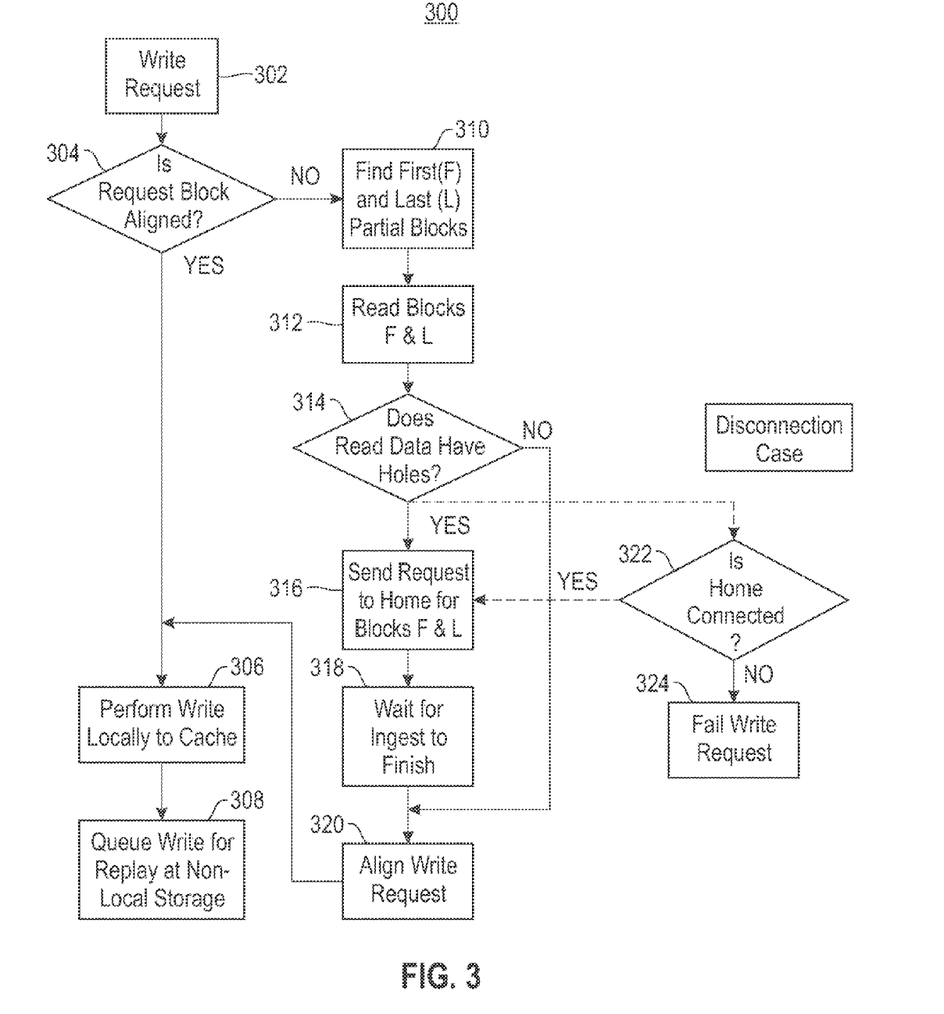
FIG. 3 depicts a flow chart illustrating design of partial file caching while serving a write request.

Partial caching of files is enabled with respect to read requests and write requests. FIG. 1 described in detail above demonstrates satisfying read requests. FIG. 3 is a flow chart (300) illustrating the design of partial file caching while serving a write request. A write request is received (302), and it is determined if the request is block aligned so that the starting offset is at the beginning of the file system block and the count of bytes to be read or written is also a multiple of the file system block size (304). If the response to the determination at step (304) is positive, the write request is performed local to the cache (306), followed by queuing the write for reply at the remote system (308). Accordingly, the write request is evaluated for block alignment.

In some circumstances the write request is not block aligned. Following a negative response to the determination at step (304), the first and last partial blocks are found (310). For any given write request, only the first and/or the last block can be non-aligned. Once the first and last partial blocks are identified, both of these blocks are checked in their entirety to verify if they are available in the cache (312). Following step (312), it is determined if the first and last blocks read at step (312) are missing in the cache (314). If at step (314) it is determined that these two blocks are not holes, then the write request is aligned (320), and the process returns to step (306) for performing the write request. However, if at step (314) it is determined that these two blocks are holes, a read-modify-write is conducted wherein a read request is sent to the remote system to obtain the first and last blocks (316) and the write request waits for ingestion of the blocks (318) before proceeding to step (320) for completion of the write request.

As shown, the write request is performed locally to cache if and when the request is block aligned. If at step (314) it is determined that the first and last blocks are not block aligned, communication with the remote system is required. In one embodiment, the remote system may be disconnected, i.e. also referred to herein as a disconnection scenario. Following a positive response to the determination at step (314), the disconnection scenario ascertains if the remote system is in communication with the write request and the local cache (322). A positive response to the determination at step (322) is followed by a return to step (316). However, a negative response to the determination at step (322) is followed by a fail of the write request (324). Accordingly, in one embodiment, a communication to the remote system is preceded by ascertainment of communication between the local cache and associated write request with the remote system.

For a normal operation, a file is either created in cache or at remote system. If the file is created at the remote system, it will be read into the cache. Similarly, if the file is created in cache, it will be replayed to the remote system. One option is to replay creation of the file asynchronously so the application does not have to incur the overhead of network communication with the remote system. In order to accomplish this, the cache may maintain a queue in memory to keep track of cache updates that have not yet been applied to the remote file system. In the course of normal operations, this queue provides a log of updates made in the cache and is sufficient to apply changes to the remote file system. However, it is possible that this in-memory queue is lost before the file created or written in the cache is replayed to the remote system. This may occur either due to failure of the server on which the queue is maintained, or because the cache does not have sufficient memory to keep track on all changes when there is a long-term failure in the communication between the cache and the remote system. As such, tools need to be provided to make sure the written data is replayed to the remote system once the communication is available again. In the absence of an on-disk state that captures all the updates happening in the cache, a mechanism needs to be provided to identify the lost updates. Specifically, since the file may be partially cached, the cache needs to be able to distinguish between holes that are created by an application through file truncation and those that exist because the corresponding data areas have not yet been read. One way to accomplish this is by associating state with each updated file in the form of extended attributes.

Figure 4:
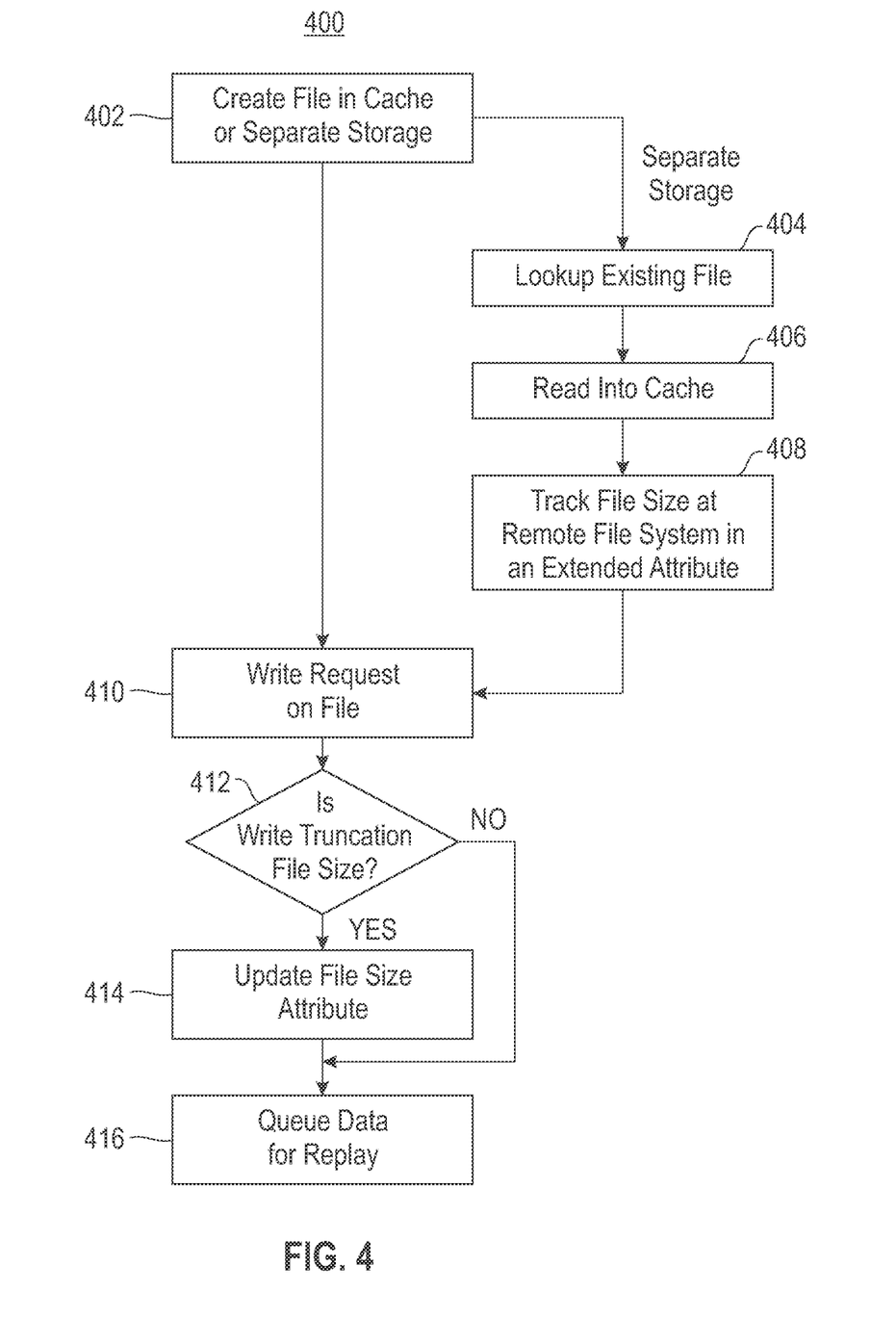
FIG. 4 depicts a flow chart illustrating a process of creating a file at the cache, and how the written data is replayed to the remote system.

FIG. 4 is a flow chart (400) illustrating the process of creating a file at the cache, and how the file data is replayed, e.g. written, to the separate file system. A file may be created in the cache or in the remote system (402). If the file is created in the remote system, the existing file is looked up (404) and read into the cache (406). For each file, the cache keeps track of the file size at the remote file system in an extended attribute (408). If a file exists at the remote file system and is read into the cache, this recorded remote file size matches the size of the file when it is first accessed in the cache. On the other hand, if the file is created in the cache, this attribute is initialized to a value of zero. When a local write operation is performed on the file (410), it is determined if the write operation is truncating the file size (412). More specifically, at step (412) it is determined if the file size is being reduced as a result of the write operation. A negative response to the truncating inquiry is followed by queuing data associated with the write operation for replay at the remote system (416). However, a positive response to the determination at step (412) is followed by updating the file size attribute to the new file size (414) and a return to step (416). During the write operation shown herein the file size is tracked and in limited circumstances updated. Specifically, the remote file size is tracked to handle failure of replaying the writes in the event of a failure.

Figure 5:
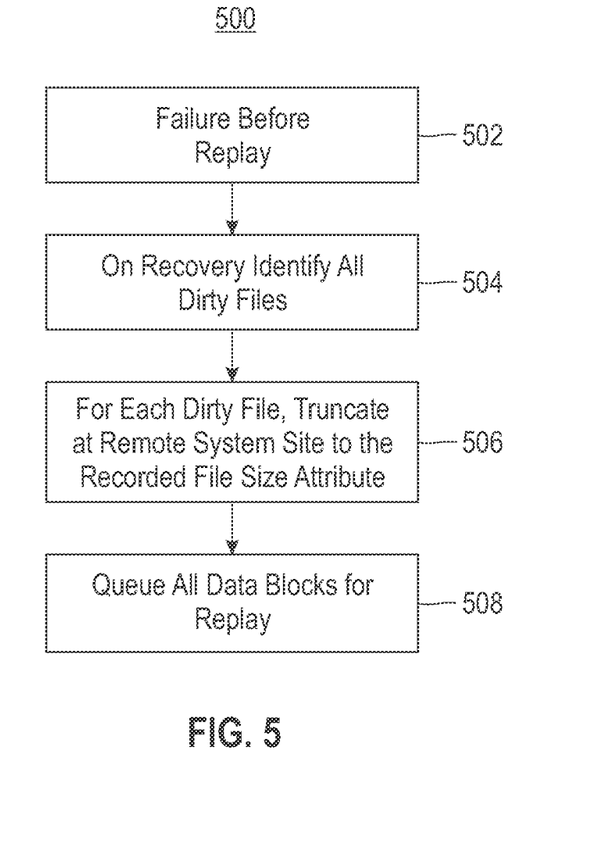
FIG. 5 depicts a flow chart illustrating an aspect of recovery wherein the cache system suffers a failure before replaying a write to the remote file system and uses persistent state to recover write data that has not been replayed to the remote file system.

As shown in FIG. 4, the file subject to the write operation is queued for replay at step (416). However, in one embodiment, there may be a failure before the replay starts, or after the replay starts and before it concludes. FIG. 5 is a flow chart (500) illustrating the aspect recovery. In response to detection of a failure before replay (502), all the dirty files are identified (504). A dirty file is a file that has been modified in the cache but the changes have not yet been replayed to the remote system. For each dirty file, the file is truncated at the remote system site to the recorded file size attribute (506). Thereafter, all data blocks for each dirty file are placed in a queue for replay to the remote system (508). In one embodiment, the process is repeated for all files that are identified as dirty files. Accordingly, as demonstrated in FIG. 5, a recovery process is instituted for all files that are subject to replay and have also been exposed to some form of a failure.

As demonstrated in FIGS. 1-5, the processes support partial caching of files at block boundaries. In order to maintain integrity of the files, there is no pre-fetching for write operations, and by tracking the file size, a recovery process is supported on failures associated with write operations.

Figure 6:
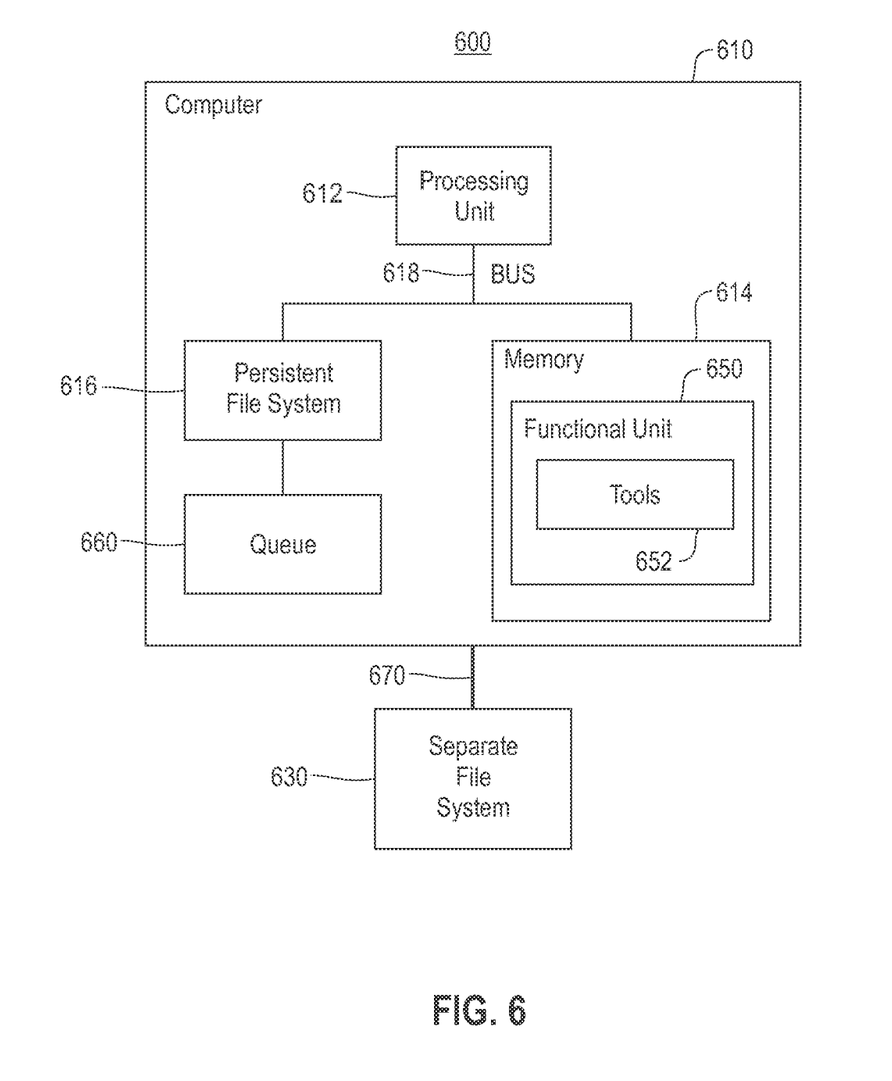
FIG. 6 depicts a block diagram illustrating tools embedded in a computer system to support partial caching of files on block boundaries.

The processes shown in FIGS. 1-5 may be embodied as hardware components. FIG. 6 is a block diagram (600) illustrating tools embedded in a computer system to support partial caching of files on block boundaries. As shown, the system includes a computer (610) in communication with a separate file system (630) across a network (670). The computer (610) is provided with a processing unit (612) in communication with memory (614) and a cache file system (616) across a bus (618). The separate file system (630) is shown in communication with the computer (610) to store received data. In one embodiment, both the cache file system (616) and the separate file system (630) are persistent storage. In addition, the separate file system (630) is shown herein as a persistent storage device although in one embodiment the remote system may be a different type of storage device. In one embodiment, the separate file system (630) may be remote with access to storage provided through a network communication. Similarly, in one embodiment, the cache file system (616) and the separate file system (630) are comprised of multiple physical machines participating to form a single file system.

The computer (610) includes a functional unit (650) having one or more tools (652) to support partial file caching. As data is being access, it is stored in the cache file system (616) on a block boundary; both read and write requests are aligned on the block boundary. In response to receipt of a read request, the tools (652) convert the read to align on the block boundary. The read is satisfied from the cache file system (616), with any cache misses satisfied with a remote call to the separate file system (630). In one embodiment, the separate file system (630) is a remote file system in a cache relationship with the cache file system (626). In response to receipt of a write request, any partial block write are aligned to the block boundary. The associated write is performed on the local cache, with the write data placed in a queue (660) for replay at the separate file system (630). To support synchronization between the cache file system (616) and the separate file system (630), the tools (652) re-validate the file size of the file subject to the read or write request on both the cache file system (616) and the separate file system (630). In the event the file sizes are not equivalent, the tools reconcile a non-equivalent file. The re-conciliation includes clearing all cached blocks of the file from the cache file system (616). Accordingly, the cache data is subject to replay at the separate file system (630), with the files subject to reconciliation in the event their files are different sizes.

It is understood that there may be a failure either at the cache file system (616) or the separate file system (630), with the failure affecting the synchronization of data between the two file systems. In the event of a failure associated with a write request at the cache site (616) prior to synchronization to the separate file system (630), the tools (652) enable recovery of the data. More specifically, the recovery includes distinguishing between a missing block in the cache that is caused by truncation ("punching" a hole) and that due to uncached blocks. Furthermore, the recovery includes a replay of any write requests that change the file size at the separate file system (630), including the write request reducing the file size, updating of an attribute of the file size, and writing any blocks beyond the reduced file size to the separate file system (630).

As identified above, the tools (652) are shown residing in memory (614) of the computer (610). Although in one embodiment, the tools (652) may reside as hardware tools external to the memory (614). In another embodiment, the tools (652) may be implemented as a combination of hardware and software in the system shown herein. Similarly, in one embodiment, the tools (652) may be combined into a single functional item that incorporates the functionality of separate items. As shown herein, the tools (652) are shown local to one computer system (610). However, in one embodiment they may be collectively or individually distributed across a shared pool of configurable computer resources and function as a unit to support partial file caching. Accordingly, the tools may be implemented as software tools, hardware tools, or a combination of software and hardware tools.

Furthermore, the described features, structures, or characteristics may be combined in any suitable manner in one or more embodiments. Examples of the tools have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit(s) described above in FIG. 6 has been labeled with tools. The tools may be implemented in programmable hardware devices such as field programmable gate arrays, programmable array logic, programmable logic devices, or the like. The tool(s) may also be implemented in software for processing by various types of processors. An identified tool of executable code may, for instance, comprise one or more physical or logical blocks of computer instructions which may, for instance, be organized as an object, procedure, function, or other construct. Nevertheless, the executable of an identified tool need not be physically located together, but may comprise disparate instructions stored in different locations which, when joined logically together, comprise the tool(s) and achieve the stated purpose of the tool(s).

Indeed, a tool associated with executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Figure 7:
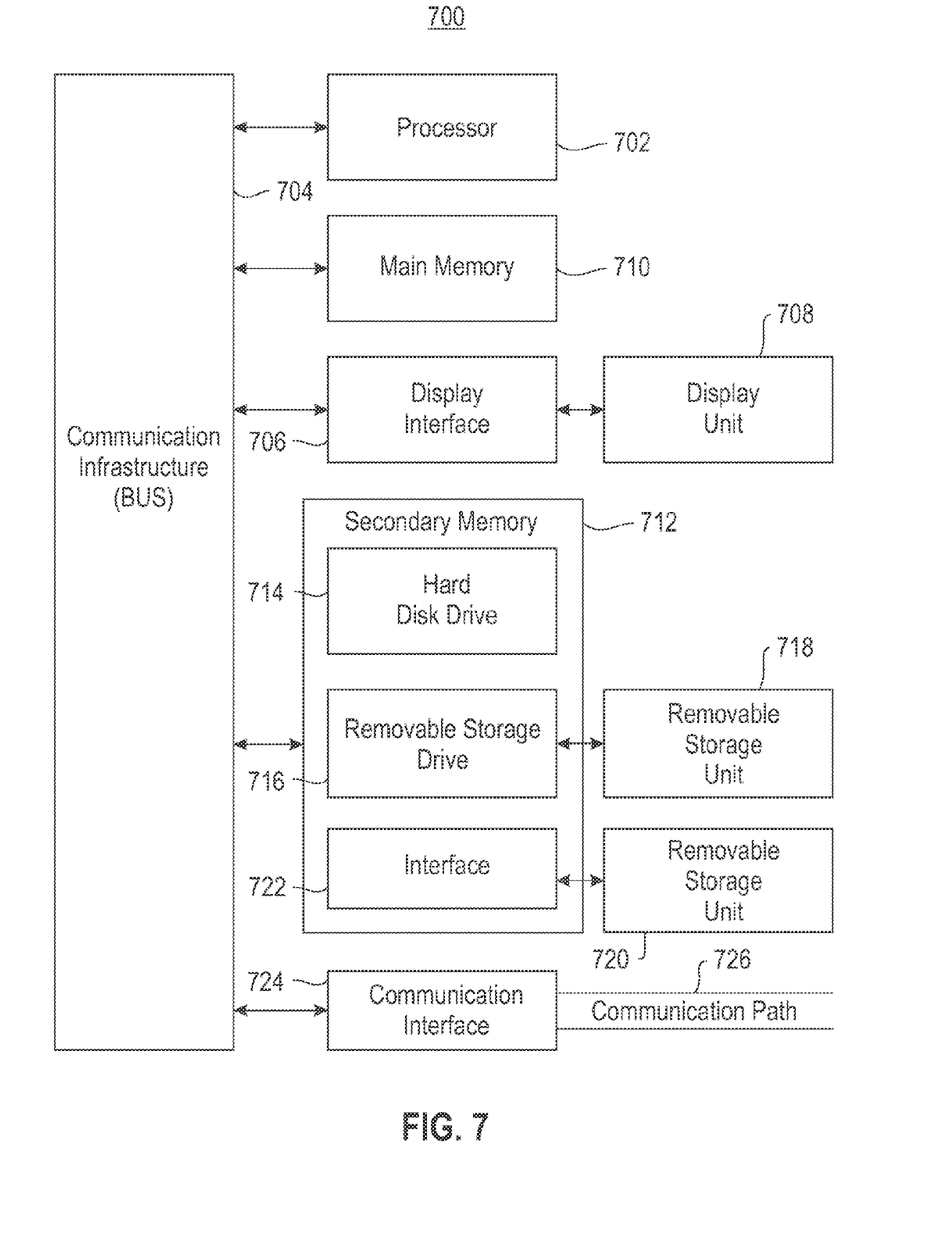
FIG. 7 depicts a block diagram of a computing environment according to an embodiment of the present invention.

Referring now to the block diagram of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) is in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for partial file caching in a clustered file system comprising:
    a processor in communication with a cache file system populating data on demand, including populating data as it is being access from a separate file system and maintaining modifications to cached data and the populated data with the separate file system;
    the processor storing the data on a file system block boundary;
    for a read request, the processor aligning the request on the block boundary; and
    for a write request, the processor aligning a partial block request to the block boundary.

2. The method of claim 1, further comprising performing the write request on the cache file system, and asynchronously writing data associated with the write request at the separate file system.

3. The method of claim 2, further comprising maintaining a file size tracking attribute to support replay of file data.

4. The method of claim 3, further comprising queueing all data blocks for each dirty file for replay at the separate file system.

5. The method of claim 4, further comprising in response to detecting a failure of the replay, identifying all dirty files and truncating each dirty file at the separate file system to the file size attribute.

6. A computer program product for partial file caching in a clustered file system, the computer program product comprising a computer readable storage hardware device having program code embodied therewith, the program code executable by a processor to:
    populate data on demand, including populating data as it is being access from a separate file system and maintaining modifications to cached data and the populated data with the separate file system;
    store the data on a file system block boundary;
    for a read request, align the request on the block boundary; and
    for a write request, align a partial block request to the block boundary.

7. The computer program product of claim 6, further comprising program code to perform the write request on the cache file system, and asynchronously write data associated with the write request at the separate file system.

8. The computer program product of claim 7, further comprising program code to maintain a file size tracking attribute to support replay of file data.

9. The computer program product of claim 8, further comprising program code to queue all data blocks for each dirty file for replay at the separate file system.

10. The computer program product of claim 9, further comprising program code to detect a failure of the reply and in response to the detection, identify all dirty files and truncate each dirty file at the separate file system to the file size attribute.

11. A system comprising:
    a processing unit in communication with memory and cache having a cache file system to support partial file caching in a clustered file system including:
        a cache file system to populate data on demand, including population of data as it is being access from a separate file system and maintenance of modifications to cached data and the populated data with the separate file system;
        store the data on a file system block boundary;
        for a read request, align the request on the block boundary; and
        for a write request, align a partial block request to the block boundary.

12. The system of claim 11, further comprising performance of the write request on the cache file system, and asynchronously write data associated with the write request at the separate file system.

13. The system of claim 12, further comprising a file size tracking attribute maintained to support replay of file data.

14. The system of claim 13, further comprising placement of all data blocks for each dirty file in a queue for replay at the separate file system.

15. The method of claim 14, further comprising in response to detection of a failure of the replay, identification of all dirty files and truncation of each dirty file at the separate file system to the file size attribute.

* * * * *